United States Patent [19]

Buffie

[11] 4,319,554
[45] Mar. 16, 1982

[54] FUEL SYSTEM FOR INTERNAL COMBUSTION ENGINES

[76] Inventor: Albert E. Buffie, 6 Gatineau Bay, Winnipeg, Manitoba, Canada, R2J 1T8

[21] Appl. No.: 161,910

[22] Filed: Jun. 23, 1980

[51] Int. Cl.³ .................... F02B 33/00; F02D 23/00; F02M 13/00
[52] U.S. Cl. .................... 123/559; 123/555; 123/575
[58] Field of Search ............ 123/555, 556, 557, 575, 123/576, 577, 578, 559

[56] References Cited

U.S. PATENT DOCUMENTS

| | | | |
|---|---|---|---|
| 2,205,750 | 6/1940 | Ross | 123/555 |
| 2,733,698 | 2/1956 | Voigt | 123/557 |
| 2,865,355 | 12/1958 | Hilton | 123/577 |
| 3,473,522 | 10/1969 | Bailey | 123/556 |
| 3,554,174 | 1/1971 | Clawson | 123/556 |
| 3,618,579 | 11/1971 | Varran | 123/577 |
| 3,963,013 | 6/1976 | Authement | 123/555 |
| 4,022,173 | 5/1977 | Read | 123/556 |
| 4,174,691 | 11/1979 | Trexler, Sr. | 123/555 |
| 4,230,081 | 10/1980 | Meek | 123/555 |

*Primary Examiner*—Wendell E. Burns

[57] ABSTRACT

Initially the engine operates normally with the exhaust gases preheating the air from the air cleaner intake, said air then being pressurized prior to it entering the carburetor. As the coolant temperature increases, heated coolant flows through a double heater coil within a chamber in which gasoline is contained. This vaporizes the gasoline and increases its pressure within the chamber until a predetermined pressure is reached which actuates a pressure switch controlling a solenoid valve which in turn by-passes the carburetor and allows pressurized fuel vapor to mix with preheated air under pressure thus operating the internal combustion engine on the cracked fuel and hot air mixture. When the engine is shut down the system returns to the original condition ready for the next starting cycle.

24 Claims, 1 Drawing Figure

FUEL SYSTEM FOR INTERNAL COMBUSTION ENGINES

BACKGROUND OF THE INVENTION

This invention relates to new and useful improvements in fuel systems for internal combustion engines which utilize a hydrocarbon fuel such as gasoline.

It is well known that much of the fuel value of gasoline is wasted or not utilized and that if the fuel could be broken down into its constituent parts before being compressed and burned within the engine, greater percentage of efficiency could be obtained.

The present invention utilizes waste heat from the engine, firstly, to preheat the air and secondly, to raise the temperature of the fuel thereby vaporizing same and pressurizing the vapor to which it is mixed with the preheated and compressed air prior to entering the engine.

In accordance with the invention there is provided in a carburetor system an air intake and an inlet manifold, a carburetor operatively connected thereto, a supply of fuel, an exhaust system, a coolant system including a radiator and a thermostat operatively controlling the flow of coolant to and from said radiator; the improvement comprising in combination: means for compressing the air from said air intake, means to preheat said air by said exhaust system, a fuel vaporizing unit operatively connected to the supply of fuel, means to operatively connect said coolant system with said fuel vaporizing unit to vaporize fuel within said unit when said coolant reaches a predetermined temperature, means to operatively connect said fuel vaporizing unit with said inlet manifold when a predetermined pressure of vapor is generated within said unit, and means to by-pass the carburetor and route the preheated and compressed air from said air intake to said inlet manifold and to mix same with the fuel vapor from said unit.

Another advantage of the present invention is to provide a device of the character herewithin described which operates from start until predetermined temperatures are reached, with a conventional carburetor and then automatically switches to the constituent fuel/air mixture when such temperatures are reached within the coolant system.

Another advantage of the invention is to provide a device of the character herewithin described which is readily adapted for use with the majority of internal combustion engines.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

BRIEF DESCRIPTION

Figure 1:
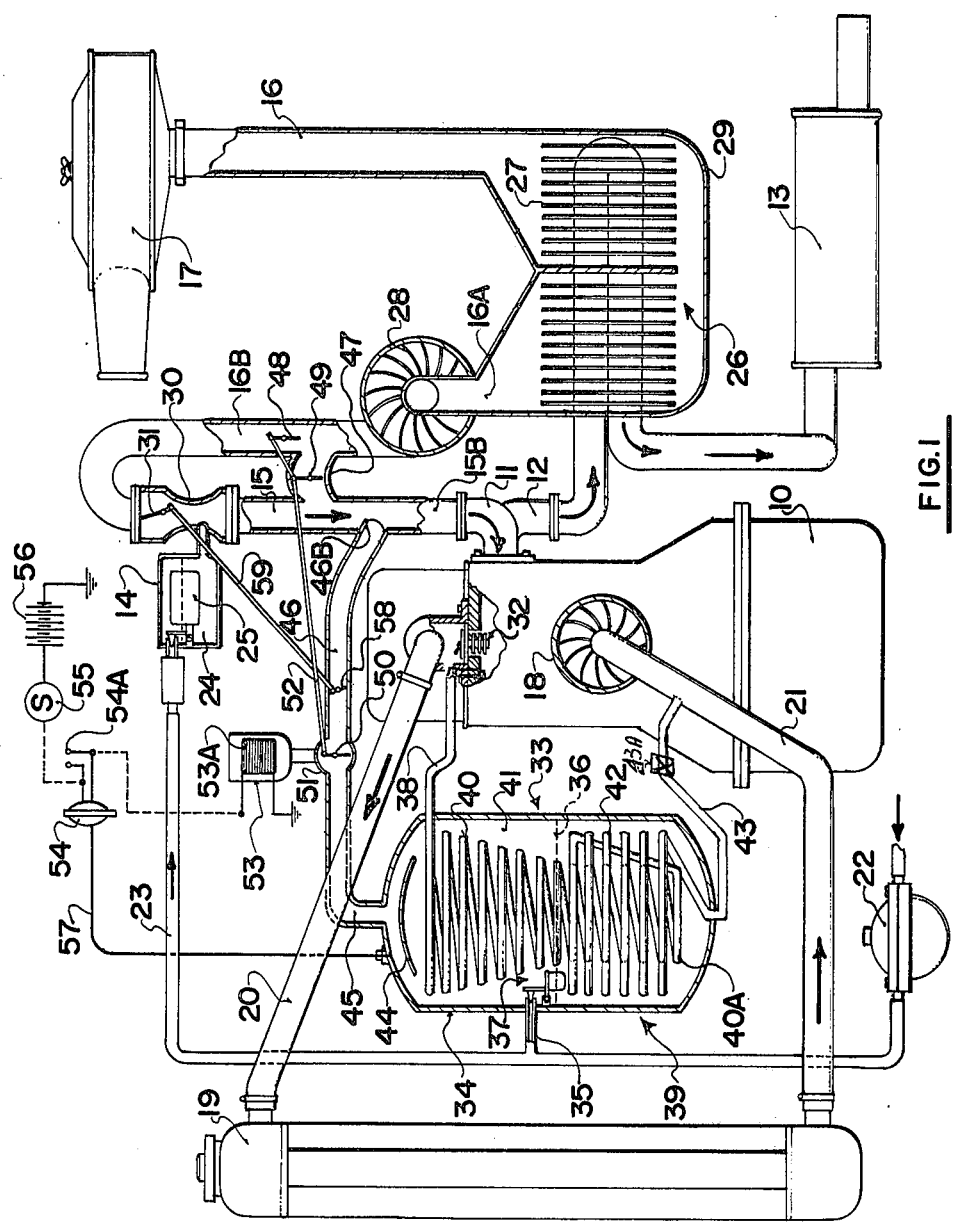
FIG. 1 is a schematic view of the device.

Proceeding therefore to describe the invention briefly, reference character 10 illustrates schematically the front elevation of a standard in-line engine having an intake manifold 11, an exhaust manifold 12 connected to a muffler system 13.

A conventional carburetor 14 is connected to the intake manifold by means of conduit 15 and air is supplied to the carburetor via conduit 16 after having passed through a conventional air intake and air cleaner assembly 17.

The coolant system is conventional and consists of fluid circulating around the engine jacket by means of a water pump 18 and is connected to a conventional radiator 19 via the upper outlet hose 20 and returns to the pump via the lower inlet hose 21.

Fuel is supplied from a tank (not illustrated) by means of a conventional fuel pump 22 via fuel line 23 to the float chamber 24 of the carburetor which controls the level of fuel by means of the float assembly 25 all of which is conventional.

DETAILED DESCRIPTION

In detail, and dealing first with the air supply, this enters via the air cleaner 17 and conduit 16. It passes through a heat exchanger collectively designated 26 which is connected in series with the exhaust manifold and muffler and is conventional in construction and operation inasmuch as the exhaust gases pass through the heat exchanger before reaching the muffler. The heat exchanger includes radiating fins 27 over which the air passes from conduit 16, being assisted in its passage by means of a blower or compressor assembly 28 which is conventional in construction and is operated from the engine in a conventional manner.

The heat exchanger is contained within a housing 29 with conduit 16 being connected on one side thereof and conduit 16A extending between the other side of the housing and the aforementioned blower or compressor assembly 28.

From there compressed and preheated air travels via conduit 16B to the carburetor, passing the conventional venturi 30 into which gasoline is drawn in a conventional manner in the form of a fine spray. The quantities are controlled by means of the throttle valve 31 operated conventionally by the operator of the vehicle.

When the coolant within the engine reaches a predetermined temperature, a conventional thermostat 32 operates to permit the coolant to flow through the radiator in the normal way and at the same time to flow into a fuel vaporizing unit collectively designated 33.

This fuel vaporizing unit consists of a sealed chamber 34 into which fuel is pumped from the fuel pump 22 via a branch conduit 35 extending from conduit 23 with the level of fuel indicated by line 36, being controlled by a conventional float valve assembly collectively designated 37, similar in operation to the float valve assembly 25 in the carburetor.

A portion of the hot coolant passing through thermostat 32, also passes through a branch line 38 situated upstream of the thermostat, and through the wall of the chamber and into a heat exchanger collectively designated 39 which takes the form of a coil tubing 40 situated within the chamber and extends from adjacent the upper end thereof to adjacent the bottom end thereof and it will be noted that in the upper portion of the chamber constituting the vaporizing portion 41, the diameter of the tubing is greatest gradually decreasing to the portion of the tubing 40A within the lower or liquid carrying part of the chamber.

The lower end of the coil is then connected in series to a further coil 42 surrounding the lower portion 40A, both the lower portion 40A and the second coil 42 being submerged within the liquid fuel within the chamber. The coil is then connected to the lower conduit 21 by means of return conduit 43, entering conduit 21 just prior to same being connected to the water pump 18. A conventional temperature control valve 43A is situated in conduit 43 and controls coolant flow through the heat exchanger coils.

A baffle shown schematically by reference character 44 extends across the top of the chamber but spaced therefrom shielding a vapor outlet 45 and this vapor outlet is connected to a vapor conduit 46, the purpose of which will hereinafter be described.

Referring back to the compressed and heated air conduit 16B, normally connected to the carburetor 14, a by-pass connection 47 is provided between conduit 16B and the intake conduit 15 leading to the inlet manifold 11 and the portion 15B of this conduit 15 between by-pass 47 and the inlet 11 is referred to as a mixing chamber.

A valve such as a butterfly valve 48 is situated within the conduit portion 16B just above the by-pass 47 and a further valve such as butterfly valve 49 is situated within the by-pass 47.

A control valve such as butterfly valve 50 is situated within a portion 51 within conduit 46 extending from the chamber 34 and the distal end 46B of this conduit 46 extends through the wall of the mixing chamber 15B and discharges therein when operative.

Linkage 52 connects valves 48, 49 and 50 together so that when the control valve 50 is actuated, the other valves 48 and 49 are actuated concurrently and it will be observed from FIG. 1 that in the position shown, valve 48 is open and valves 49 and 50 are closed so that the by-pass 47 is inoperative and the air passes through the carburetor to the intake manifold in the usual way.

A conventional solenoid 53 is operatively connected to valve 50 which is normally closed as shown and this solenoid is actuated by a conventional pressure switch 54, said pressure switch being normally open and being indicated by the contacts 54A.

Current for the coil 53A of the solenoid is taken from one side of the ignition switch 55 which is connected to storage battery 56 both of which are shown schematically, so that when the ignition switch is "on", current is available to the solenoid coil 53A when contacts 54A are closed by the pressure switch 54.

This pressure switch 54 is operatively connected via a conduit 57 to the top portion of the chamber 34 of the fuel vaporizing unit 39 so that when a predetermined pressure of vapor has been generated within chamber 34, the pressure switch is actuated thus closing contacts 54A, actuating solenoid coil 53A and opening valve 50 at the same time opening valve 49 and closing valve 48.

In operation, and assuming the engine is cold, the ignition switch 55 is moved to the "on" position and the engine is started in the usual manner with air being drawn through conduit 16, being compressed by blower 28 and then passing through the venturi 30 of the carburetor 14 thus providing the desired mixing of fuel and air to the intake manifold 11.

It is assumed that the solenoid 53 is in its normally closed position due to the fact that the contacts 54A of the pressure switch are in their usual open position so that control valve 50 is closed as is valve 49 with valve 48 being open.

As soon as the engine starts, exhaust gases heat the heat exchanger 26 thereby preheating the air prior to its reaching the carburetor which in itself assists in the vaporization of the fuel entering the venturi.

The blower 28 increases the volume of fuel/air mixture and with the increase vaporization of the fuel, increases the efficiency of the engine when running under these normal conditions.

Thermostat 32 will be closed until the coolant reaches a predetermined temperature whereupon thermostat 32 opens allowing heated coolant to flow through the radiator. Heated coolant also flows through branch line 38 and coils 40 and 42 controlled by temperature control valve 43A.

Fuel is maintained within the chamber at the level indicated by line 36, being supplied by fuel pump 22. The heating coils 40 and 42 vaporize the fuel into the upper portion of the chamber which contains the upper portion 40 of the coil which in turn superheats the vapor and causes it to break down into its constituent parts and at the same time raises the pressure of the vapor within this chamber because the chamber remains sealed because control valve 50 is closed.

The baffle 44 assists in retaining the heat and the pressure raises until it actuates pressure switch 54 which in turn actuates solenoid 53 thereby opening valves 50 and 49 and closing valve 48.

This by-passes the preheated and pressurized air directly to the mixing chamber 15B where it mixes with the vapor under pressure prior to entering the intake manifold.

The amount of vapor is controlled by the further butterfly valve 58 within conduit 46 down stream from valve 50 and connected by linkage 59 to the main throttle valve 31.

Under these circumstances, the engine continues to operate with the carburetor 14 being completely by-passed and utilizing the constituents of the fuel which have been heated and vaporized within the chamber 34.

It should be understood that the heat passing through coils 40, 40A and 42 is sufficient to boil the liquid fuel and to superheat the volatiles of the vapor boiled off from the fuel.

It is desirable that the chamber be pressurized from between 6 to 8 inches WC pressure, said pressure being controlled of course by the setting of the pressure switch 54.

When the ignition is switched off, coil 53A is deenergized so that valve 50 closes thus sealing the chamber 34 and assisting in maintaining the pressure therewithin. The closing of valve 50 also closes valve 49 and opens valve 48 so that the engine reverts to a conventional carburetor operated condition ready for the next start up sequence.

It will be appreciated that there is an increase in the time, temperature and turbulence interval before the fuel reaches the intake manifold.

An example of the greater efficiences provided by this system is given below from figures taken from American Gas Association tables. Now with the gas volume corrected to 60° F. at 30" Hg—Dry. The analysis given is for Premium Gasoline.

---

C - 84.90 Carbon - 12,347.856 BTU's
H - 14.76 Hydrogen - 7,372.027 BTU'x
S - 0.08 Sulphur - 318.64 BTU's
    9.739 Specific Gravity
    6.152 lbs/American Gallon -continued 7.39 lbs/Imperial Gallon $$\text{BTU.lb} = 14{,}544\, C + 62{,}028\left(H_2 - \frac{O_2}{8}\right) + 4{,}050\, S \quad (1)$$

= 21,750 BTU's - or 11.528 Calories/Gram -
Ignition Temp 500°–800° F.
Atmosphere = 21% $O_2$ - 79% $N_2$ by Volume -
13.063 Ft.$^3$/lb.

O ⟶ Atom. Wt. 16.000 - Atom No. 8

Combustion of Hydrogen

| | Atom Wt. | Atom No. | Ft$^3$ - $O_2$ Requ'd | Ft$^3$ - Air Requ'd |
|---|---|---|---|---|
| Mole H = | 1.0080 | 1 | 0.5 | 2.38 |
| | lbs $O_2$ Requ'd | lbs Air Requ'd | $H_2O$ Product | |
| Pound H = | 7.940 | 34.340 | 8.94 | |

Molecular Ration = $\boxed{H_2}\, \boxed{H_2} + \boxed{O_2} \longrightarrow \boxed{2\,H_2O}$ Molecular Weight = (2 + 2) + (16 + 16)
      4    +    4    ⟶ 36

Total Reaction Mole Weight = 1 + 8 ⟶ 8.94 lbs $H_2O$

Reaction Calorific Valve ⟶ 61,100 BTU's/lb
Ignition temperature in Air 1065° F. generates temp. max. 4000° F.

Combustion of Carbon

| | Atom Wt. | Atom No. | Ft$^3$ - $O_2$ Requ'd | Ft$^3$ - Air Requ'd |
|---|---|---|---|---|
| Mole C = | 12.011 | 6 | 1.0 | 4.76 |
| | lbs $O_2$ Requ'd | | lbs Air Requ'd | |
| Pound C = | 2.66 | | 11.53 | |

Molecular Ratio = $\boxed{C} + \boxed{O_2} \longrightarrow \boxed{CO_2}$

Molecular Weight = 12 + (16 + 16)
      12 +    32    ⟶ 36

Total Reaction Mole Weight 1 + 2.67 ⟶ 3.67 $CO_2$
Reaction Calorific Value 14,093 BTU's
Ignition temperature in Air 1130° F.
Generates temp. max. 3700° F.

Combustion of Sulphur

| | Atom Wt. | Atom. No. | Ft$^3$ - $O_2$ Requ'd | Ft$^3$ - Air Requ'd |
|---|---|---|---|---|
| Mole S = | 32.066 | 16 | 1.0 | 4.76 |
| | lbs. $O_2$ Requ'd | | lbs Air Requ'd | |
| Pound S = | 1.00 | | 4.29 | |

Molecular Ration = $\boxed{S} + \boxed{O_2} \longrightarrow \boxed{SO_2}$

Molecular Weight = 32 + 32 ⟶ 64

Total Reaction Mole Weight = 1 + 1 ⟶ 2 $SO_2$
Reaction Calorific Value = 3983 BTU's
Ignition temperature in Air = 470° F.

Finally the advantages of the present device not only include the increase in fuel economy and efficiency but also because of its flexible design, may be produced in kit form and can readily be adapted to use with various designs of internal combustion engines as major design changes are not required to the original engine and carburetor system.

Although the device has been described for use with an engine utilizing gasoline as the fuel, nevertheless it is adaptable for use with diesel engines in that it can preheat the diesel fuel towards the flash point before entering the fuel injector pumps. The air supply preheat principle remains the same and can enhance the efficiency of diesel engine also.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a carburation system for internal combustion engines which include an air intake and an inlet manifold, a carburetor operatively connected thereto, a supply of fuel, an exhaust system, a coolant system including a radiator and a thermostat operatively controlling the flow of coolant to and from said radiator; the improvement comprising in combination:
   (a) means for compressing the air from said air intake,
   (b) means to preheat said air by said exhaust system,
   (c) a fuel vaporizing unit operatively connected to the supply of fuel,
   (d) means to operatively connect said coolant system with said fuel vaporizing unit to vaporize fuel within said unit when said coolant reaches a predetermined temperature,
   (e) means to operatively connect said fuel vaporizing unit with said inlet manifold when a predetermined pressure of vapor is generated within said unit and
   (f) means to by-pass the carburetor and route the preheated and compressed air from said air intake to said inlet manifold and to mix same with the fuel vapor from said unit.

2. The device according to claim 1 which includes a mixing chamber operatively connected to said intake manifold, said preheated compressed air and said fuel vapor from said unit mixing within said mixing chamber.

3. The device according to claim 1 in which said means to preheat air from said air intake includes a heat exchanger in series with said exhaust system, the air from said air intake passing over said heat exchanger.

4. The device according to claim 2 in which said means to preheat air from said air intake includes a heat exchanger in series with said exhaust system, the air from said air intake passing over said heat exchanger.

5. The device according to claim 1 in which said fuel vaporizing unit includes,
   (a) a sealed chamber operatively connected to said source of fuel,
   (b) means in said chamber to control the level of fuel within said chamber and
   (c) a heat exchanger within said chamber operatively connected to the coolant system of said engine.

6. The device according to claim 2 in which said fuel vaporizing unit includes,
   (a) a sealed chamber operatively connected to said source of fuel,
   (b) means in said chamber to control the level of fuel within said chamber and
   (c) a heat exchanger within said chamber operatively connected to the coolant system of said engine.

7. The device according to claim 3 in which said fuel vaporizing unit includes,
(a) a sealed chamber operatively connected to said source of fuel,
(b) means in said chamber to control the level of fuel within said chamber and
(c) a heat exchanger within said chamber operatively connected to the coolant system of said engine.

8. The device according to claim 4 in which said fuel vaporizing unit includes,
(a) a sealed chamber operatively connected to said source of fuel,
(b) means in said chamber to control the level of fuel within said chamber and
(c) a heat exchanger within said chamber operatively connected to the coolant system of said engine.

9. The invention according to claim 5 in which said means operatively connecting said fuel vaporizing unit with said inlet manifold includes,
(a) a by-pass channel between said means to preheat said air and said intake manifold,
(b) first valve means between said by-pass channel and said carburator,
(c) further valve means in said by-pass channel, said first valve means being open when said further valve means is closed and vice versa,
(d) control valve means between said unit and said intake manifold, said control valve means being closed when said further valve means is closed and vice versa, and
(e) a pressure switch operated solenoid operatively connecting said control valve means with said first valve means and said further valve means to operate same concurrently reactive to a predetermined pressure of the fuel vapor within said unit.

10. The invention according to claim 6 in which said means operatively connecting said fuel vaporizing unit with said inlet manifold includes,
(a) a by-pass channel between said means to preheat said air and said intake manifold,
(b) first valve means between said by-pass channel and said carburator,
(c) further valve means in said by-pass channel, said first valve means being open when said further valve means is closed and vice versa,
(d) control valve means between said unit and said intake manifold, said control valve means being closed when said further valve means is closed and vice versa, and
(e) a pressure switch operated solenoid operatively connecting said control valve means with said first valve means and said further valve means to operate same concurrently reactive to a predetermined pressure of the fuel vapor within said unit.

11. The invention according to claim 7 in which said means operatively connecting said fuel vaporizing unit with said inlet manifold includes,
(a) a by-pass channel between said means to preheat said air and said intake manifold,
(b) first valve means between said by-pass channel and said carburator,
(c) further valve means in said by-pass channel, said first valve means being open when said further valve means is closed and vice versa,
(d) control valve means between said unit and said intake manifold, said control valve means being closed when said further valve means is closed and vice versa, and
(e) a pressure switch operated solenoid operatively connecting said control valve means with said first valve means and said further valve means to operate same concurrently reactive to a predetermined pressure of the fuel vapor within said unit.

12. The invention according to claim 8 in which said means operatively connecting said fuel vaporizing unit with said inlet manifold includes,
(a) a by-pass channel between said means to preheat said air and said intake manifold,
(b) first valve means between said by-pass channel and said carburator,
(c) further valve means in said by-pass channel, said first valve means being open when said further valve means is closed and vice versa,
(d) control valve means between said unit and said intake manifold, said control valve means being closed when said further valve means is closed and vice versa, and
(e) a pressure switch operated solenoid operatively connecting said control valve means with said first valve means and said further valve means to operate same concurrently reactive to a predetermined pressure of the fuel vapor within said unit.

13. The device according to claim 5 in which said heat exchanger within said fuel vaporizer unit includes,
(a) a single coil operatively connected to said coolant system, and
(b) a further coil surrounding the lower part of said single coil within the liquid fuel in said unit, said coils being in series, the upper part of said single coil superheating the vaporized fuel in the part of said chamber above the level of liquid fuel therein.

14. The device according to claim 6 in which said heat exchanger within said fuel vaporizer unit includes,
(a) a single coil operatively connected to said coolant system, and
(b) a further coil surrounding the lower part of said single coil within the liquid fuel in said unit, said coils being in series, the upper part of said single coil superheating the vaporized fuel in the part of said chamber above the level of liquid fuel therein.

15. The device according to claim 7 in which said heat exchanger within said fuel vaporizer unit includes,
(a) a single coil operatively connected to said coolant system, and
(b) a further coil surrounding the lower part of said single coil within the liquid fuel in said unit, said coils being in series, the upper part of said single coil superheating the vaporized fuel in the part of said chamber above the level of liquid fuel therein.

16. The device according to claim 8 in which said heat exchanger within said fuel vaporizer unit includes,
(a) a single coil operatively connected to said coolant system, and
(b) a further coil surrounding the lower part of said single coil within the liquid fuel in said unit, said coils being in series, the upper part of said single coil superheating the vaporized fuel in the part of said chamber above the level of liquid fuel therein.

17. The device according to claim 9 in which said heat exchanger within said fuel vaporizer unit includes,
(a) a single coil operatively connected to said coolant system, and
(b) a further coil surrounding the lower part of said single coil within the liquid fuel in said unit, said coils being in series, the upper part of said single coil superheating the vaporized fuel in the part of said chamber above the level of liquid fuel therein.

18. The device according to claim 10 in which said heat exchanger within said fuel vaporizer unit includes,
   (a) a single coil operatively connected to said coolant system, and
   (b) a further coil surrounding the lower part of said single coil within the liquid fuel in said unit, said coils being in series, the upper part of said single coil superheating the vaporized fuel in the part of said chamber above the level of liquid fuel therein.

19. The device according to claim 11 in which said heat exchanger within said fuel vaporizer unit includes,
   (a) a single coil operatively connected to said coolant system, and
   (b) a further coil surrounding the lower part of said single coil within the liquid fuel in said unit, said coils being in series, the upper part of said single coil superheating the vaporized fuel in the part of said chamber above the level of liquid fuel therein.

20. The device according to claim 12 in which said heat exchanger within said fuel vaporizer unit includes,
   (a) a single coil operatively connected to said coolant system, and
   (b) a further coil surrounding the lower part of said single coil within the liquid fuel in said unit, said coils being in series, the upper part of said single coil superheating the vaporized fuel in the part of said chamber above the level of liquid fuel therein.

21. The device according to claims 9, 10 or 11 which includes,
   (a) a mixing chamber for said vapor and said preheated air situated between said by-pass channel and said intake manifold, and
   (b) a pressure switch operatively connected to said chamber and to said solenoid,
   (c) said solenoid closing said first valve means and opening said further valve means and said control valve means, when in one position, and
   (d) opening said first valve means and closing said further valve means and said control valve means when in another position, said control valve means being normally closed when said engine is inoperative thereby assisting in preserving the pressure of fuel vapor within said chamber.

22. The device according to claim 12, 13 or 14 which includes,
   (a) a mixing chamber for said vapor and said preheated air situated between said by-pass channel and said intake manifold, and
   (b) a pressure switch operatively connected to said chamber and to said solenoid,
   (c) said solenoid closing said first valve means and opening said further valve means and said control valve means, when in one position, and
   (d) opening said first valve means and closing said further valve means and said control valve means when in another position, said control valve means being normally closed when said engine is inoperative thereby assisting in preserving the pressure of fuel vapor within said chamber.

23. The device according to claims 15, 16 or 17 which includes,
   (a) a mixing chamber for said vapor and said preheated air situated between said by-pass channel and said intake manifold, and
   (b) a pressure switch operatively connected to said chamber and to said solenoid,
   (c) said solenoid closing said first valve means and opening said further valve means and said control valve means when in one position, and
   (d) opening said first valve means and closing said further valve means and said control valve means when in another position, said control valve means being normally closed when said engine is inoperative thereby assisting in preserving the pressure of fuel vapor within said chamber.

24. The device according to claims 18, 19 or 20 which includes,
   (a) a mixing chamber for said vapor and said preheated air situated between said by-pass channel and said intake manifold, and
   (b) a pressure switch operatively connected to said chamber and to said solenoid,
   (c) said solenoid closing said first valve means and opening said further valve means and said control valve means when in one position, and
   (d) opening said first valve means and closing said further valve means and said control valve means when in another position, said control valve means being normally closed when said engine is inoperative thereby assisting in preserving the pressure of fuel vapor within said chamber.

* * * * *